United States Patent
Zarhi et al.

(10) Patent No.: US 11,234,385 B2
(45) Date of Patent: Feb. 1, 2022

(54) TESSELLATED CERAMIC APPARATUS FOR PLANT GROWTH

(71) Applicants: Eran Zarhi, Kibbutz Kfar Hahoresh (IL); Elad Burko, Valley Stream, NY (US)

(72) Inventors: Eran Zarhi, Kibbutz Kfar Hahoresh (IL); Elad Burko, Valley Stream, NY (US)

(73) Assignee: TERRA STUDIO LTD., Herzliya (IL)

( * ) Notice: Subject to any disclaimer, the term of this patent is extended or adjusted under 35 U.S.C. 154(b) by 345 days.

(21) Appl. No.: 16/411,514

(22) Filed: May 14, 2019

(65) Prior Publication Data
US 2020/0359585 A1    Nov. 19, 2020

(51) Int. Cl.
*A01G 31/00*    (2018.01)
*A01G 31/02*    (2006.01)
*A01G 24/44*    (2018.01)

(52) U.S. Cl.
CPC ............. *A01G 31/02* (2013.01); *A01G 24/44* (2018.02)

(58) Field of Classification Search
CPC ........ A01G 31/02; A01G 24/44; A01G 9/021; A01G 9/022; A01G 9/025; A01G 9/026; A01G 9/028; A01G 9/029
USPC .......................................................... 47/64
See application file for complete search history.

(56) References Cited

U.S. PATENT DOCUMENTS

| 1,971,075 | A | * | 8/1934 | Lockwood | B28B 7/0097 47/65.5 |
| 3,252,252 | A | * | 5/1966 | Muelberger, Jr. | A01G 9/022 47/82 |
| D212,487 | S | * | 10/1968 | Black | D11/152 |
| D261,746 | S | * | 11/1981 | Harshman | D11/146 |
| 5,301,465 | A | * | 4/1994 | Caferro | A01G 9/022 47/65.8 |
| 5,549,500 | A | | 8/1996 | Manoah | |
| D381,561 | S | * | 7/1997 | Manca | D23/366 |

(Continued)

FOREIGN PATENT DOCUMENTS

FR    3009669 A1    2/2015

OTHER PUBLICATIONS

Internet archive Wayback Machine chia-pet instructions, captured: Feb. 3, 2015 (retrieved from the internet: Aug. 27, 2020, URL: https://web.archive.org/web/20150302022314/https://chia.com/chia-pets/chia-pet-instructions/.

(Continued)

*Primary Examiner* — Ebony E Evans
(74) *Attorney, Agent, or Firm* — Tutunjian & Bitetto, P.C.

(57) ABSTRACT

A tessellated ceramic apparatus for plant growth is set forth devised to support germination and plant growth upon an exterior surface. Water moves under osmotic pressure from a water storage volume disposed in osmotic communication with the ceramic, through the ceramic to become available water at the exterior surface. A graduated cross-section regulates water flow from a water storage volume through to the exterior surface along a pressure gradient exerted by the water head. Plant growth is facilitated within a plurality of tessellated indentations disposed upon the exterior surface and growth may be restricted from areas of the exterior surface by application of gloss, glaze, sealants and/or other surface features that may blend design elements to augment and support a living design.

12 Claims, 13 Drawing Sheets

(56) References Cited

U.S. PATENT DOCUMENTS

| | | | | |
|---|---|---|---|---|
| 6,237,281 | B1* | 5/2001 | Weder | A01G 5/04 |
| | | | | 47/41.01 |
| 6,298,599 | B1* | 10/2001 | Weiner | A01G 9/02 |
| | | | | 47/65.5 |
| 7,316,721 | B1* | 1/2008 | Redden | B01D 46/24 |
| | | | | 406/172 |
| D690,226 | S* | 9/2013 | Thuma | D11/152 |
| D735,601 | S* | 8/2015 | Thuma | D11/152 |
| D830,891 | S* | 10/2018 | Thuma | D11/152 |
| D904,224 | S* | 12/2020 | Springer, Jr. | D11/153 |
| 2004/0237389 | A1* | 12/2004 | Whitcomb | A01G 9/029 |
| | | | | 47/32.7 |
| 2007/0022661 | A1* | 2/2007 | Slater | A01G 27/06 |
| | | | | 47/81 |
| 2020/0147838 | A1* | 5/2020 | Hung | B29C 33/00 |

OTHER PUBLICATIONS

Internet archive Wayback Machine chia-pets, captured: Nov. 16, 2015 (retrieved from the internet: Aug. 27, 2020, URL:https://web.archive.org/web/20151116000506/https://chia.com/chia-pets/.

International Search Report from PCT/IB2020/055488 dated Sep. 9, 2020, 12 pgs.

* cited by examiner

TESSELLATED CERAMIC APPARATUS FOR PLANT GROWTH

BACKGROUND OF THE INVENTION

Various types of ceramic pots and vessels for supporting plant growth are known in the prior art. Most enclose a volume to support a potting medium. The present invention, however, does not require soil or other potting medium, enabling growth and proliferation of plants across an exterior surface of the ceramic apparatus itself.

U.S. Pat. No. 5,549,500 presents a decorative animalian figurine, designed to be augmented by plant growth to simulate hair. However, the figurine requires a body of plant life nutrient material and generally maintains seeds and roots in contact with this granular nutrient material. To like effect, U.S. Pat. No. 6,298,599 also requires potting soil or other potting medium to support the plant and enable feeding.

The well-known CHIA PET®, created by Joseph Enterprises, Inc., of San Francisco, Calif., does enable germination of particular seeds of the genus *Salvia* on an exterior surface of a ceramic body. However, the seeds themselves provide the anchoring mechanism and germinate within the haphazard grooves and pits provided in the surface by creation of a gel-like paste when wet, rather than by action of germinated roots themselves (see for example the teaching in U.S. Pat. No. 5,549,500 in this regard, a principal motivation in in the inventor devising his invention). Thus, plants other than *Salvia hispanica* and *Salvia columbariae* are generally unsuited for use with the CHIA PET®, which is particularly adapted to exploit this gel-paste engendered by seeds of species *S. hispanica* and *S. columbariae*.

What is needed is a tessellated ceramic apparatus for plant growth that includes an exterior surface having a plurality of tessellated indentations thereupon wherein seeds may be housed without necessarily forming a gel-paste, and which exterior surface facilitates the anchoring of roots thereupon, to support plant growth of various species upon the exterior surface, while enabling the diffusion of water from an associated water storage volume through the porosity of the ceramic apparatus to become available for plants proliferating upon the exterior surface. Further, controlling plant growth along tessellations and between glazed, glossy, or otherwise sealed portions of the exterior surface enables creation of elaborate living designs rendered by the plant growth.

FIELD OF THE INVENTION

The present invention relates to a tessellated ceramic apparatus for root growth, and more particularly, to a tessellated ceramic apparatus for plant growth that combines an associated water storage volume to diffuse water in a regulated manner to an exterior surface and thereby feed plants growing upon the exterior surface without the use of soil or other potting media. The present tessellated ceramic apparatus for plant growth may further enable growth of plants into elaborate designs and geometric arrays by inhibiting plant growth upon some portions of the exterior surface while encouraging growth on others. Further, the exterior surface may employ a plurality of tessellated indentations wherein seeds may be supportively upheld until germination therein whereby various species of plants may be germinated and grown upon the present invention simply by addition of water to the associated water storage volume.

SUMMARY OF THE INVENTION

The present tessellated ceramic apparatus for plant growth has been devised to enable growth of plants upon an exterior surface of the ceramic apparatus. The ceramic apparatus is porous and enables sourcing of water through the apparatus to flora growing on the exterior surface. The exterior surface has a plurality of tessellated indentations there disposed to enable anchoring of roots over the uneven surface, as well as to provide a seat for seeds therein previous to germination. The term "tessellated", as used herein throughout, is taken to mean a regular or irregular pattern of geometric indentations disposed across the exterior surface. Regular or irregular shapes, ordered or unordered in arrangement, are contemplated as within the scope of the term. Textural features, such as smaller-scale ridges, grooves, indentations, and other regular or irregular surface features, disposed across, upon, and within the tessellated indentations, may further inform the exterior surface, providing greater textural variety and facility for root anchoring thereupon.

The tessellated ceramic apparatus for plant growth therefore establishes plant growth by the simple addition of water to a water storage volume which, in example embodiments contemplated herein, is coextensive with an interior volume of the ceramic apparatus and alternately disposed in osmotic communication with the ceramic apparatus. Water therefore is osmotically conveyed through pores in the ceramic apparatus to feed plants growing over the exterior surface.

The form of the plurality of indented tessellations into geometric arrays of ordered and unordered shapes, and additionally disposed relative glazed, glossy, or sealed parts of the exterior surface, may control and/or direct the growth of the plant(s) over the exterior surface to correspond with specific designs. Glossed, glazed, or sealed parts of the exterior surface may be oriented as part of a design, to prevent outflow of water therethrough, whereby plant growth is inhibited over glazed, gloss, smooth, or sealed areas upon the exterior surface. As a result, geometric arrays may be informed and visually signaled by the plant growth.

Multiple embodiments of the present tessellated ceramic apparatus for plant growth are contemplated herein. A first embodiment contemplates a tile embodiment. The tile embodiment is essentially a parallelepiped expanse wherein the exterior surface with the plurality of tessellated indentations is disposed as an obverse surface. A reverse surface may be glazed, glossed, or sealed, to prevent transfer of water therethrough and control waterflow to the obverse surface. The plurality of tessellated indentations is sufficient to house seeds therein and maintain seeds therein when the tile embodiment is disposed upon a vertical surface. In this embodiment, the water storage volume may be disposed along one edge of the tile embodiment whereby water is drawn via capillary action and osmotic pressure through the tile to become available to the seeds and/or plants with roots contacting the exterior surface. Alternately the water storage volume may be coextensive with an interior volume disposed within the tile embodiment whereby osmosis occurs through to the exterior surface. In the case of the latter embodiment, the tile embodiment includes an impermeable base member whereby water poured into the interior volume osmotically travels to the exterior surface and then, under the influence of gravity, drains thereinto. The base member may be attachable to the bottom edge of the tile embodiment and a lid member may enclose the interior volume to prevent evaporation of water stored therein. The tile embodiment thus produces a verdant growth and may be used in conjunction with additional tile embodiments to decorate an area of a wall, for example.

Another embodiment of the present invention includes a vase embodiment. The vase embodiment includes an interior volume bounded by the exterior surface and a base portion.

The interior volume is coextensive with the water storage volume in the vase embodiment, whereby water is poured into the interior volume for storage. The water in the interior volume exerts hydrostatic pressure and osmotically travels through to the exterior surface to become available to seeds and plants growing upon the exterior surface. To lessen evaporation from the interior volume, the vase embodiment may include a lid member to sealably enclose the interior volume.

In the vase embodiments, the exterior surface likewise includes a plurality of tessellated indentations wherein seeds and root growth are supported. In some embodiments the exterior surface may include regions of glazed, glossed or sealed areas whereby growth of the plant thereupon is inhibited, and growth of the plant is conformed to particular geometric arrays suggestive of a particular design, say. Thus, in some embodiments, the plurality of indentations may define a particular geometric pattern, such as interconnected lines in a star motif, as an example illustrated herein among other potential embodiments within the contemplation of a person of ordinary skill, whereby the lines are rendered verdant by the germination and growth of plants therein. Additional and other geometric patterns and arrays are contemplated as part of this disclosure, as should be apparent to one of ordinary skill in the art.

A preferred embodiment of the vase embodiment is conical and includes a graduated cross-section having a minimum thickness most proximal an open top and a maximum thickness most proximal to the base portion. The thickness of the ceramic apparatus is devised to render a constant outflow of water from the interior volume, whereby the increased pressure at the base of the interior volume due to the water head is accommodated by a longer distance through the pores of the ceramic apparatus to reach the exterior surface. Seeds and plants growing upon the exterior surface therefore are exposed to the same rate of osmotic travel and the resulting water availability no matter where on the exterior surface disposed, as long as the interior volume is suitably filled with water. In all embodiments, then, a user may simply add water to the water storage volume and enjoy a proliferation of verdure across the exterior surface of the ceramic apparatus.

Thus has been broadly outlined the more important features of the present tessellated ceramic apparatus for plant growth so that the detailed description thereof that follows may be better understood and in order that the present contribution to the art may be better appreciated.

Objects of the present tessellated ceramic apparatus for plant growth, along with various novel features that characterize the invention are particularly pointed out in the claims forming a part of this disclosure. For better understanding of the tessellated ceramic apparatus for plant growth, its operating advantages and specific objects attained by its uses, refer to the accompanying drawings and description.

BRIEF DESCRIPTION OF THE DRAWINGS

Figures

DETAILED DESCRIPTION OF THE DRAWINGS

With reference now to the drawings, and in particular FIGS. 1 through 10 thereof, examples of the instant tessellated ceramic apparatus for plant growth employing the principles and concepts of the present tessellated ceramic apparatus for plant growth and generally designated by the reference number 10 will be described.

Figure 1A:
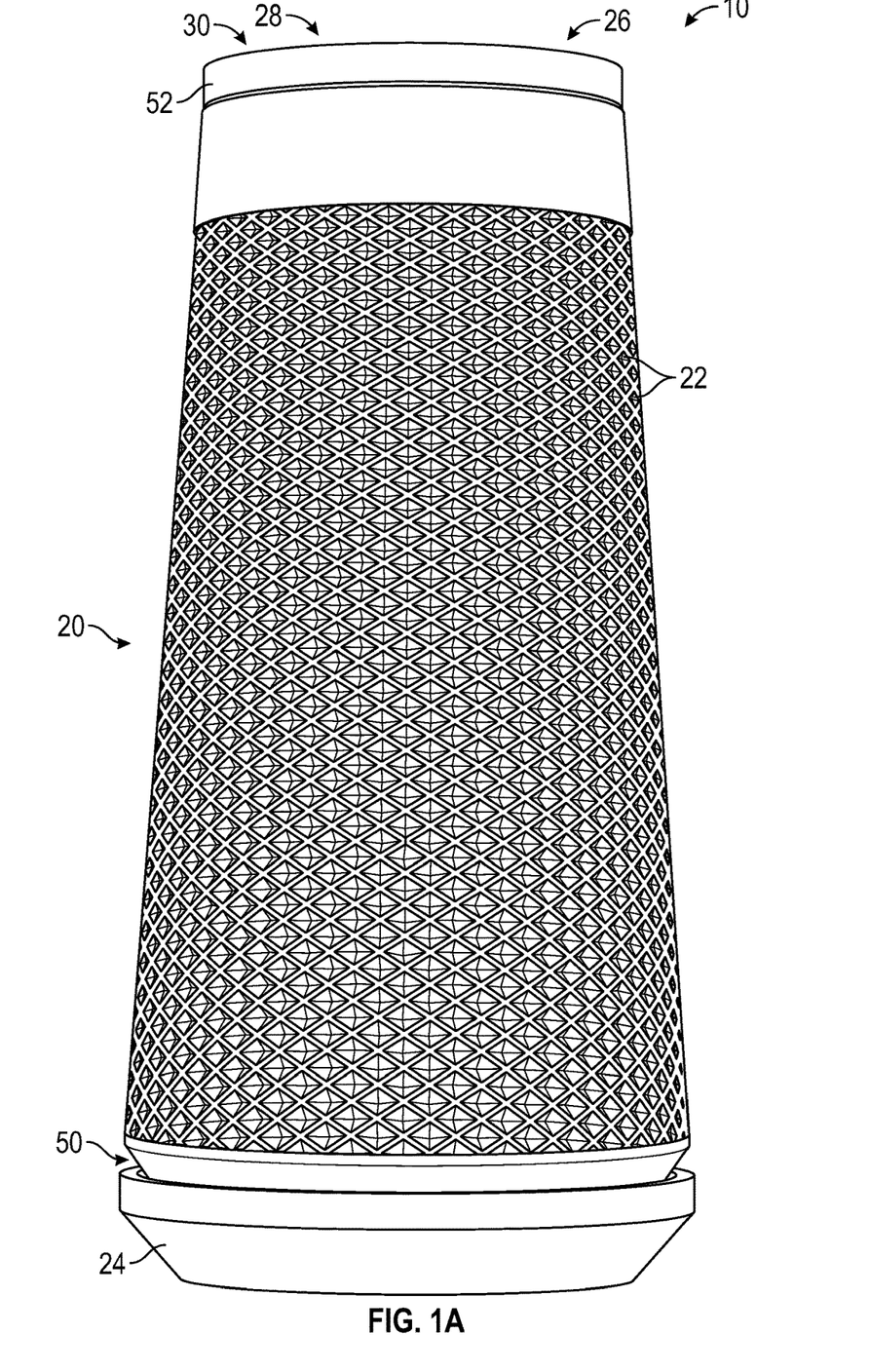
FIG. 1A is a front elevation view of an example embodiment.
Figure 1B:
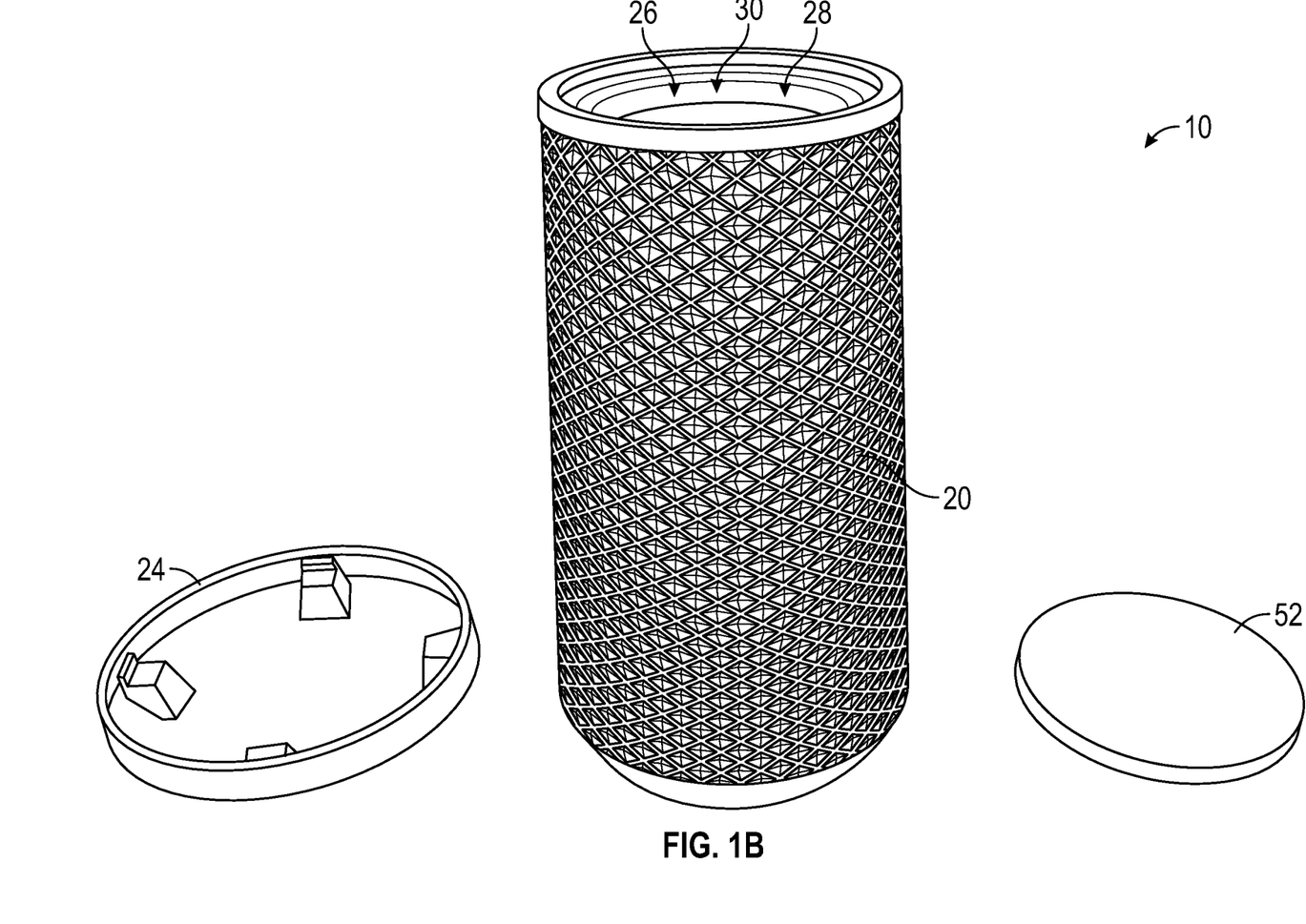
FIG. 1B is a front elevation view of an example embodiment separated from a lid and a base member.
Figure 2A:
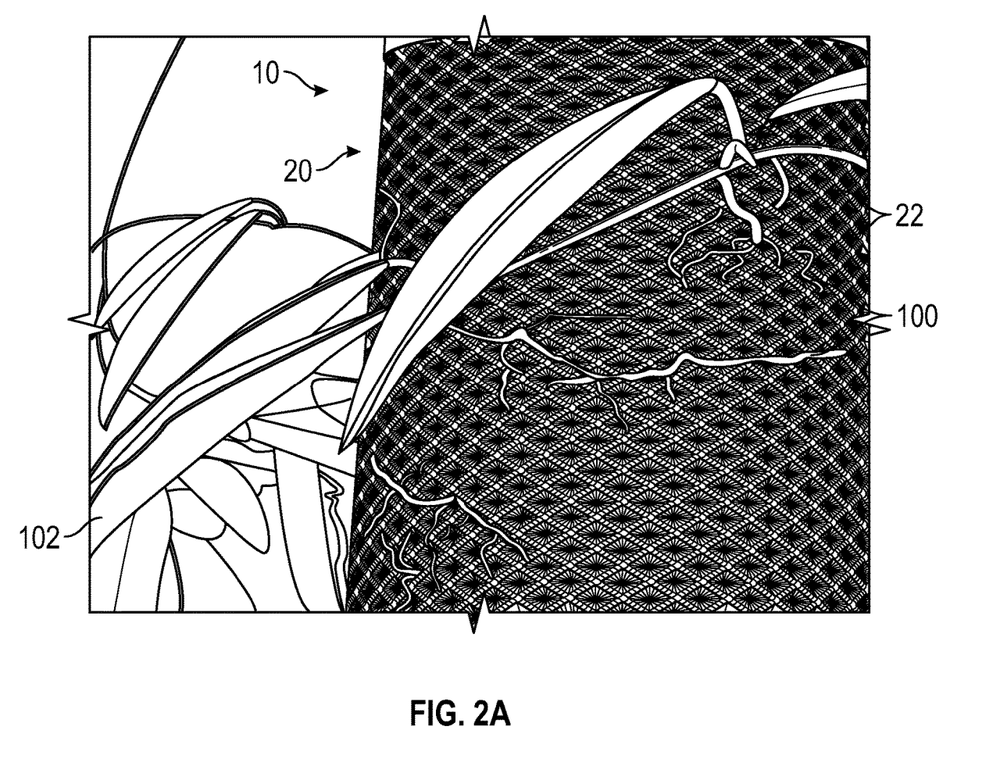
FIG. 2A is a detailed view of an example embodiment illustrating flora growing thereupon.
Figure 2B:
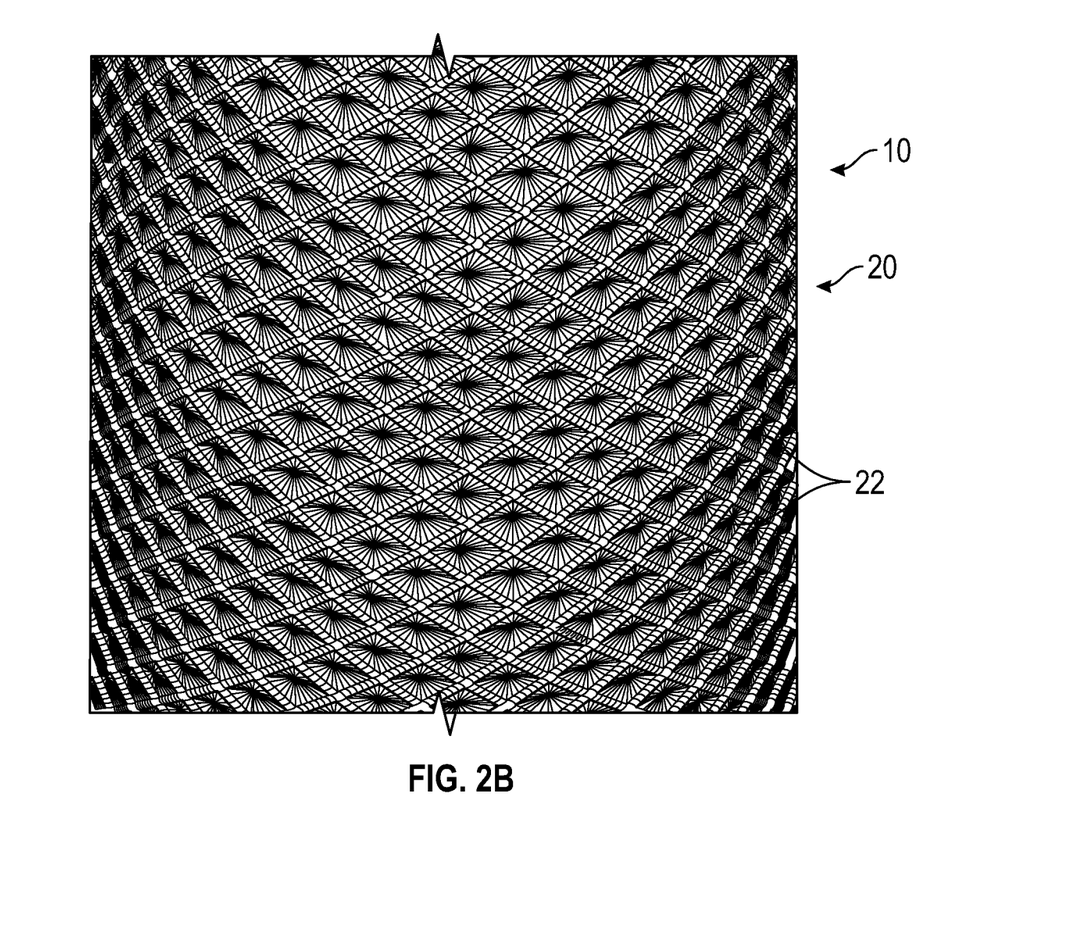
FIG. 2B is a detailed view of the example embodiment depicted in FIG. 2A without flora growing thereupon showing a plurality of textural grooves informing the tessellated exterior surface.

FIGS. 1A and 1B illustrate an example embodiment of the present invention 10 disposed as a vase. The generally conical, ceramic apparatus 10 includes an exterior surface 20 having a plurality of tessellated indentations 22 disposed in geometric array thereover. Each of the tessellated indentations 22 in the example embodiment illustrated in FIGS. 1A and 1B is lozenge-shaped, and includes an ovoid depression wherein seeds of sufficiently small size are maintainable. A plurality of sufficiently small seeds (not shown) is therefore storable upon the exterior surface 20, interior to the plurality of tessellated indentations 22 as desired. Some seeds are sized small enough whereby a plurality of such seeds is maintainable in each tessellated indentation 22, and remain therein when the example embodiment is, as shown in FIGS. 1A and 1B, placed upright upon its base member 24.

The example embodiment depicted in FIGS. 1A and 1B includes an open top 26 accessing an interior volume 28, coextensive with a water storage volume 30, wherein water is storable interior to the apparatus 10. Lid member 52 is fittable to sealably enclose the open top 26 to prevent evaporation therethrough. Base member 24 prevents water from draining through the bottom of the apparatus 10 and onto an underling surface. Open space 50, disposed at the base member 24, serves to interrupt drainage by creating a discontinuity in the osmotic pressure exerted by the water head in the column of water stored within the interior volume 28. The underside of the base member may be sealed and rendered impermeable. Base member 24 further serves to collect water draining over the exterior surface 20.

Under hydrostatic pressure, water drains transversely through the apparatus 10, from the interior volume 28, through the porosity of the ceramic 10, to the exterior surface 20 to render available water for seeds stored interior to the tessellated indentations 22 and plants growing thereupon. Subsequent germination, the water travels via capillary action and along an osmotic gradient through the apparatus 10 to become available water for plants 100 anchoring to the tessellated indentations 22. Tessellated indentations 22 may further comprise rough and uneven surface features such as a plurality of smaller grooves or other surface irregularities that assist in root anchoring thereto. See for example the detail view depicted in FIGS. 2A and 2B.

Figure 3A:
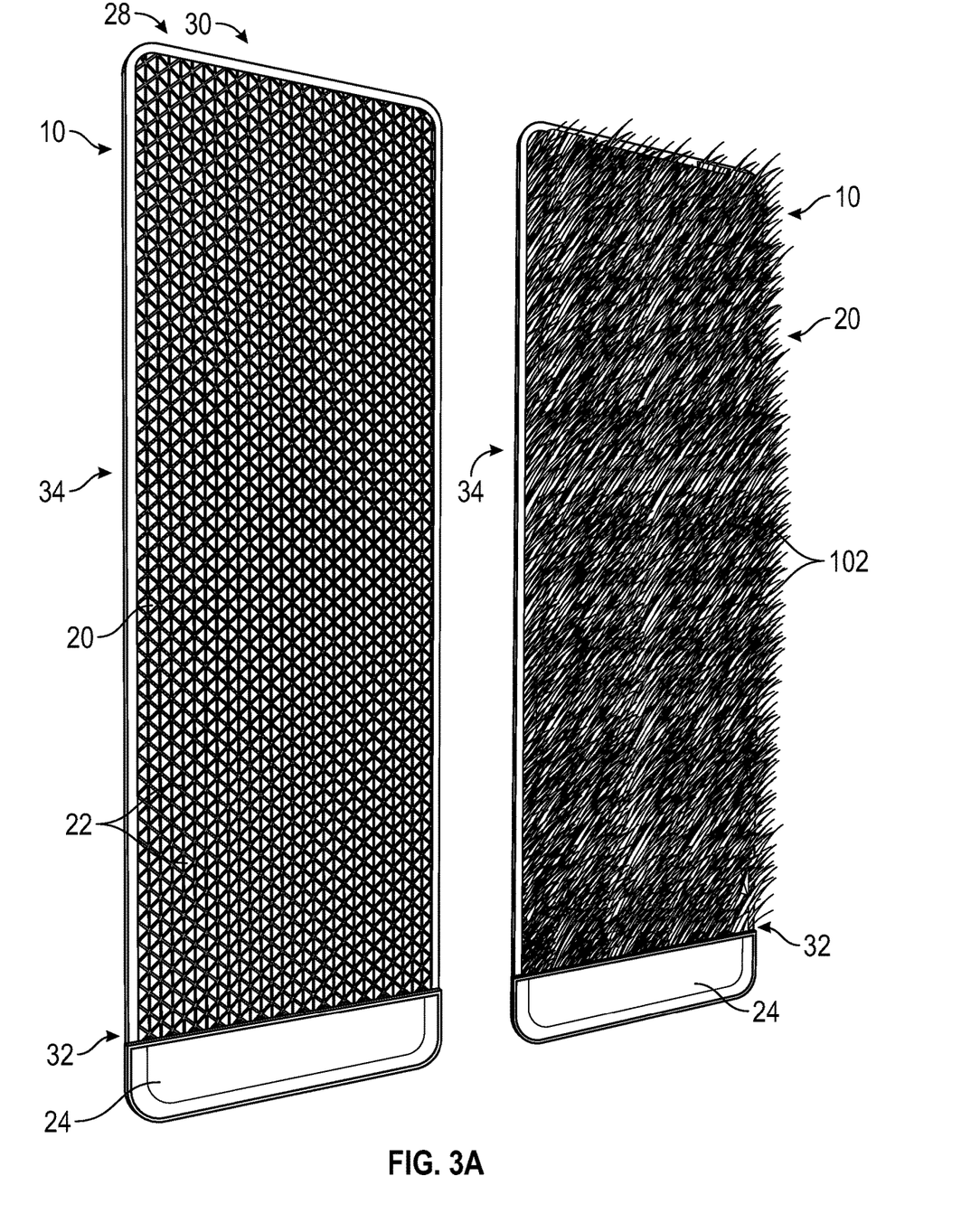
FIG. 3A is a raised elevation view of an example embodiment with and without flora growing thereupon.
Figure 3B:
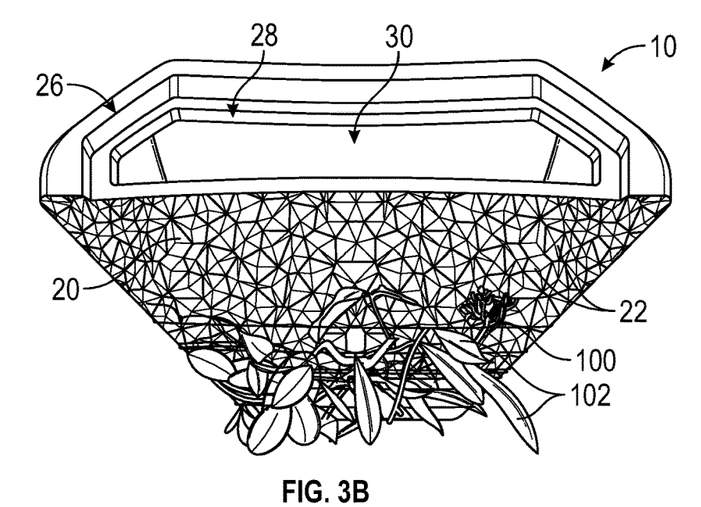
FIG. 3B is a raised perspective view of an example embodiment illustrating an open top to a tile embodiment and an exterior surface comprising irregular tessellations.
Figure 3C:
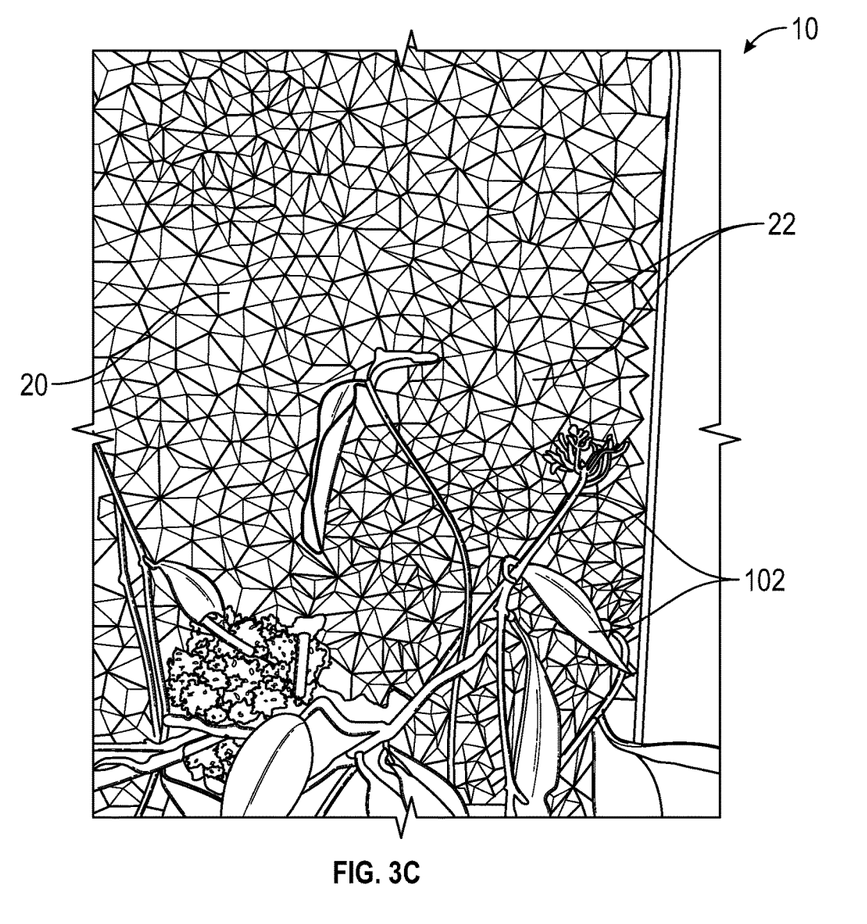
FIG. 3C is a detail view of an exterior surface of the example embodiment depicted in FIG. 3B.

Referring now to FIGS. 3A, 3B, and 3C, another example embodiment of the present device 10 is shown. In this example embodiment the ceramic apparatus 10 is configured as a tile for hanging on a wall, for example. In one example embodiment of the tile ceramic 10, the water storage volume 30 is disposed coextensive with an interior volume 28, accessible via an open top 26 and in fluid communication with the ceramic 10 (see for example FIG. 3B). A base member 24 is attachable at a lowermost edge 32 of the ceramic 10 to capture water draining over the exterior surface 20 and moving under the action of gravity towards the lowermost edge 32.

Figure 8:
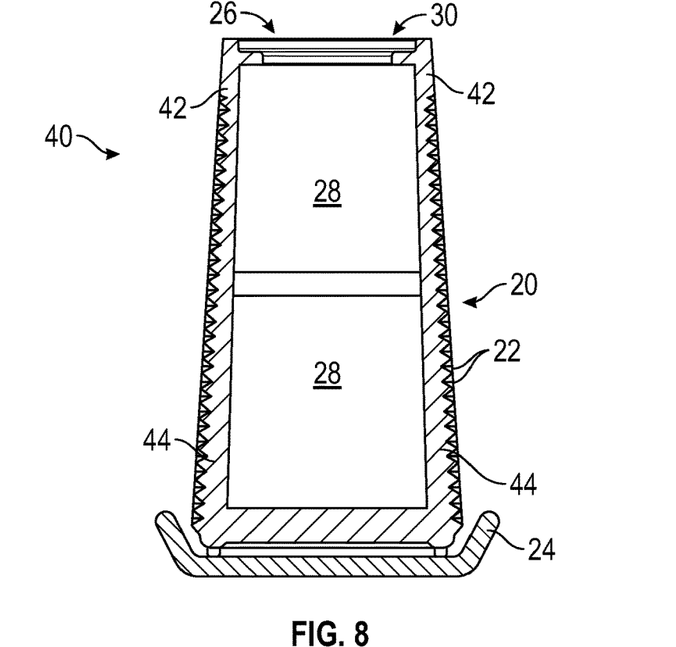
FIG. 8 is a longitudinal cross-section of an example embodiment showing a graduated cross-section between a minimum thickness and a maximum thickness bounding an interior volume.
Figure 9:
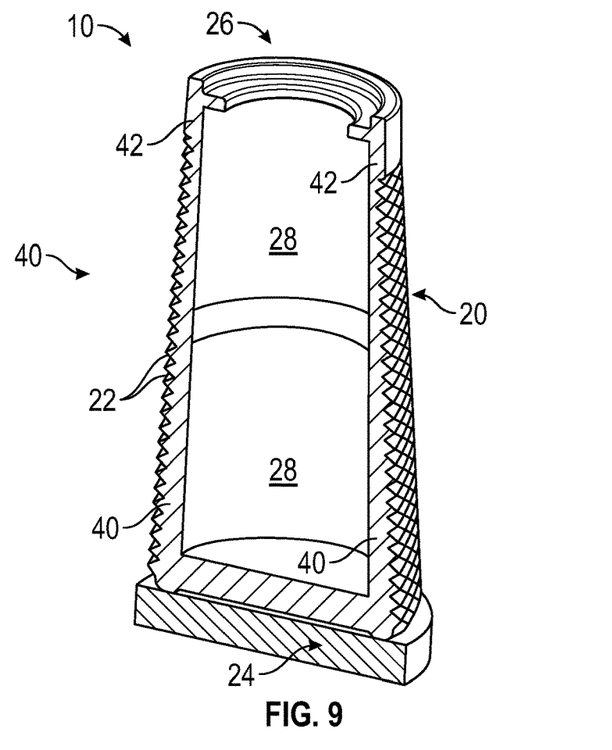
FIG. 9 is a raised elevation view of the longitudinal cross-section shown in FIG. 8.
Figure 10A:
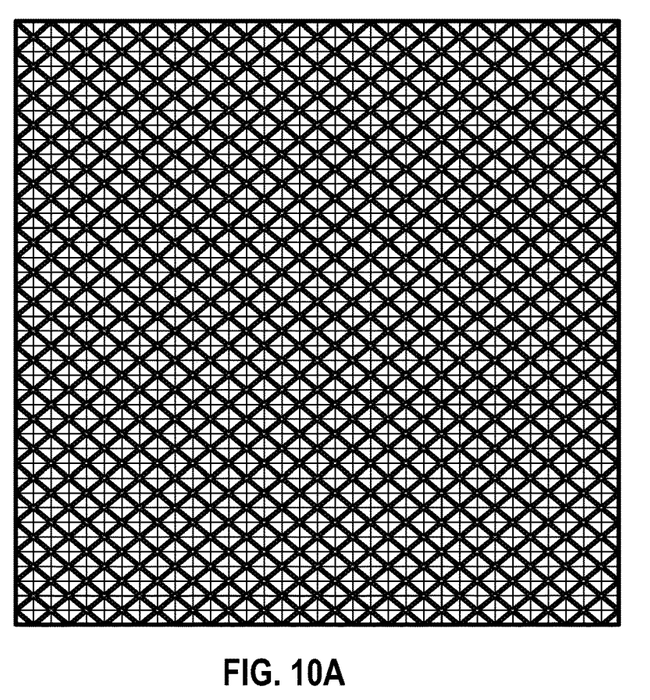
FIGS. 10A through 10D illustrate example embodiments of regular and irregular tessellated indentations.
Figure 10B:
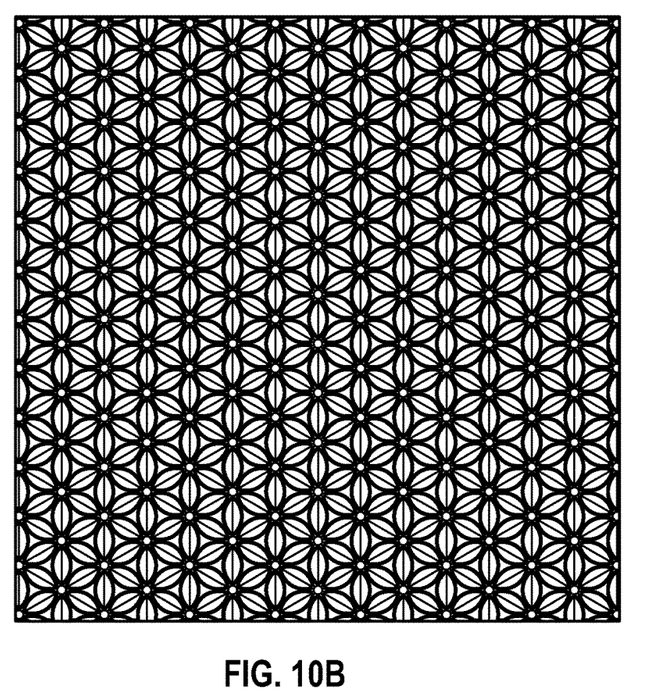
Figure 10C:
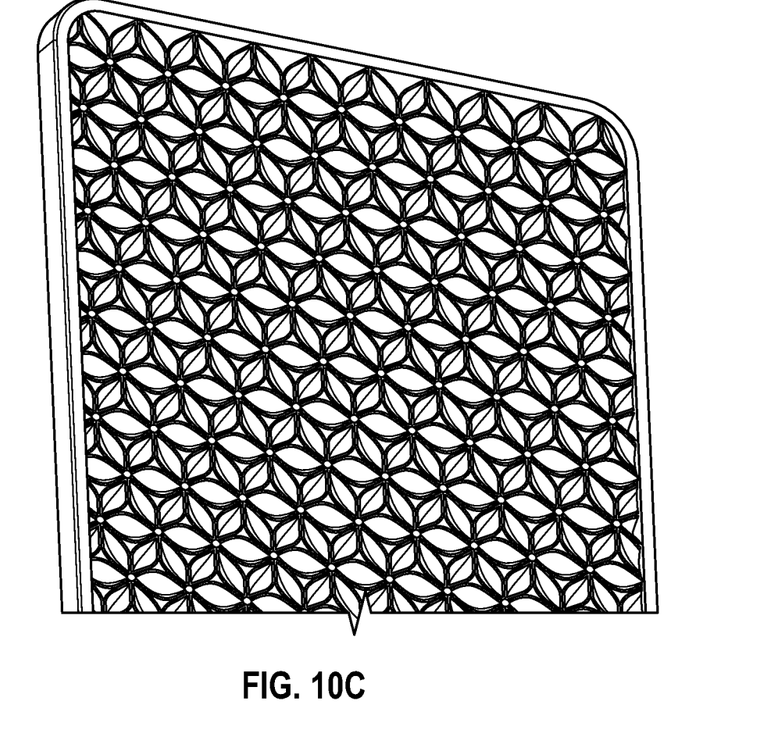
Figure 10D:
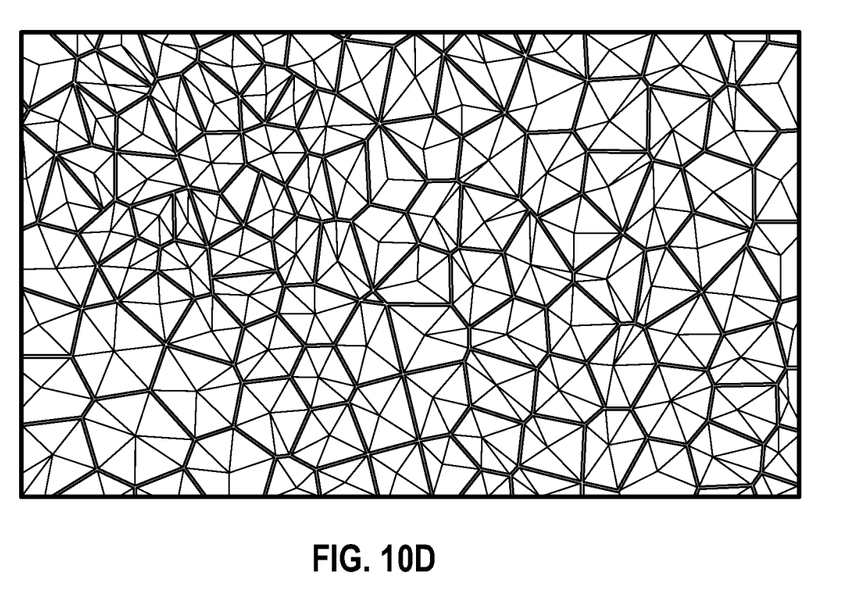

In this example embodiment, the exterior surface 20 is anteriorly disposed to outface from the wall upon which the ceramic 10 is hung. The exterior surface 20 includes a plurality of tessellated indentations 22 disposed thereover, each suited to support at least one seed therein for germination as water moves through the ceramic 10 from the water storage volume 30, through the porosity of the ceramic 10, and through to the exterior surface 20. Water in the water storage volume 30, therefore, by action of osmotic pressure along a concentration gradient, is exuded at the exterior surface 20 to render available water for seeds disposed interior to each indentation 22 and, subsequent germination of said seeds, to the roots 100 of flora 102 growing thereupon. The ceramic 10 may include a graduated cross-section (as shown in FIGS. 8 and 9, for example) having a minimum thickness, disposed most proximal the open top 26, and a maximum thickness disposed most proximal the lowermost edge 32. The graduated cross-section is devised to regulate water flow through the ceramic 10 across the pressure gradient exerted by the water head contained within the interior volume 28, as will be discussed in more detail below.

In the example embodiment illustrated in FIGS. 3A, 3B, and 3C, a basal side 34 of the ceramic 10 may be glossed, glazed, or otherwise sealed to prevent water exuding out said basal side 34 to contact the rearward wall upon which the ceramic 10 is disposed. Additionally, the plurality of tessellated indentations 22, by virtue of their indented cavities intruding into the exterior surface 20, may create an osmotic gradient that consistently leads the water to move from the storage volume 30 to the exterior surface 20, and drain to one side preferentially. It is contemplated that multiple ceramics 10 comprising this example embodiment may be hung decoratively, singly or en masse, to create a living wall aesthetically pleasing to viewers and, when used indoors, beneficial in sustaining indoor air quality. As shown in FIGS. 3B and 3C, variations in the form and array, pattern and extent, of the tessellated indentations is contemplated as part of this disclosure, including irregular tessellations, as shown for example in the detail view illustrated in FIG. 3C.

Figure 4:
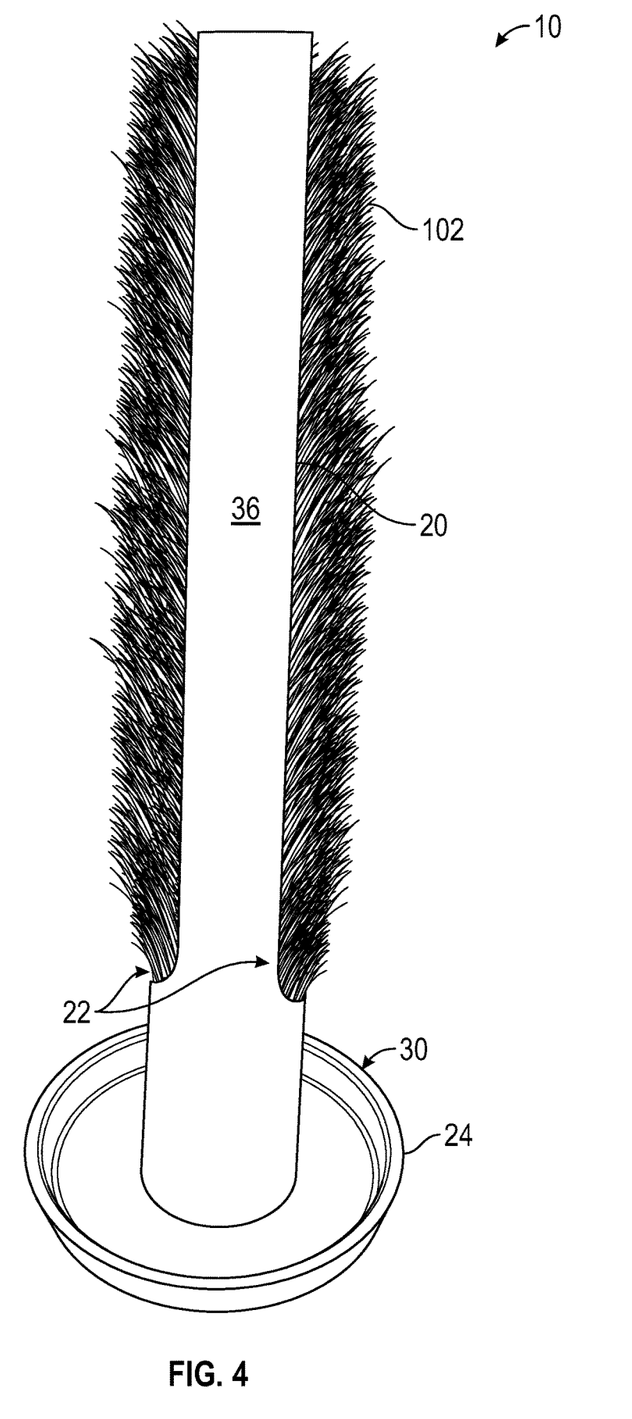
FIG. 4 is a front elevation view of an example embodiment having flora growing thereupon.

FIG. 4 illustrates an example embodiment devised to support flora 102 upon specific portions of the exterior surface 20. In this embodiment, plant growth is facilitated upon the exterior surface 20 but restricted from proliferation on specific portions of the exterior surface 20. Restriction of plant growth may be effective by use of glazes, glosses, sealants, or other surface features that seal the porosity of the ceramic 10 over a desired expanse, and therefore prevent water availability thereat, or by other means to prevent root anchoring thereto. Thus water from the water storage volume 30 may be prevented from reaching certain areas of the exterior surface 20, but instead caused to drain or move under osmotic pressure to other parts of the exterior surface 20, whereby specific patterns may be embodied by the flora 102 supported and growing upon the exterior surface 20.

In the embodiment shown in FIG. 4 the water storage volume 30 may be coextensive with an interior volume 28 similar to the interior volume as discussed above in regards to the embodiment shown in FIG. 1 (and also below in reference to FIGS. 8 and 9). However, the water storage volume 30 may also be disposed as free water contained within the confines of base member 24. In such an embodiment, water confined by the base member 24 is moved up the ceramic 10 under osmotic pressure and capillary action through the porosity of the ceramic 10 to exude out of portions of the exterior surface 20 that are unglazed, not glossed or otherwise not sealed from the movement of water. Thus, availability of water is controlled and growth of the associated flora 102 therefore is maintainable into certain patterns or areas upon the exterior surface 20 for reasons of aesthetic appeal.

Figure 5:
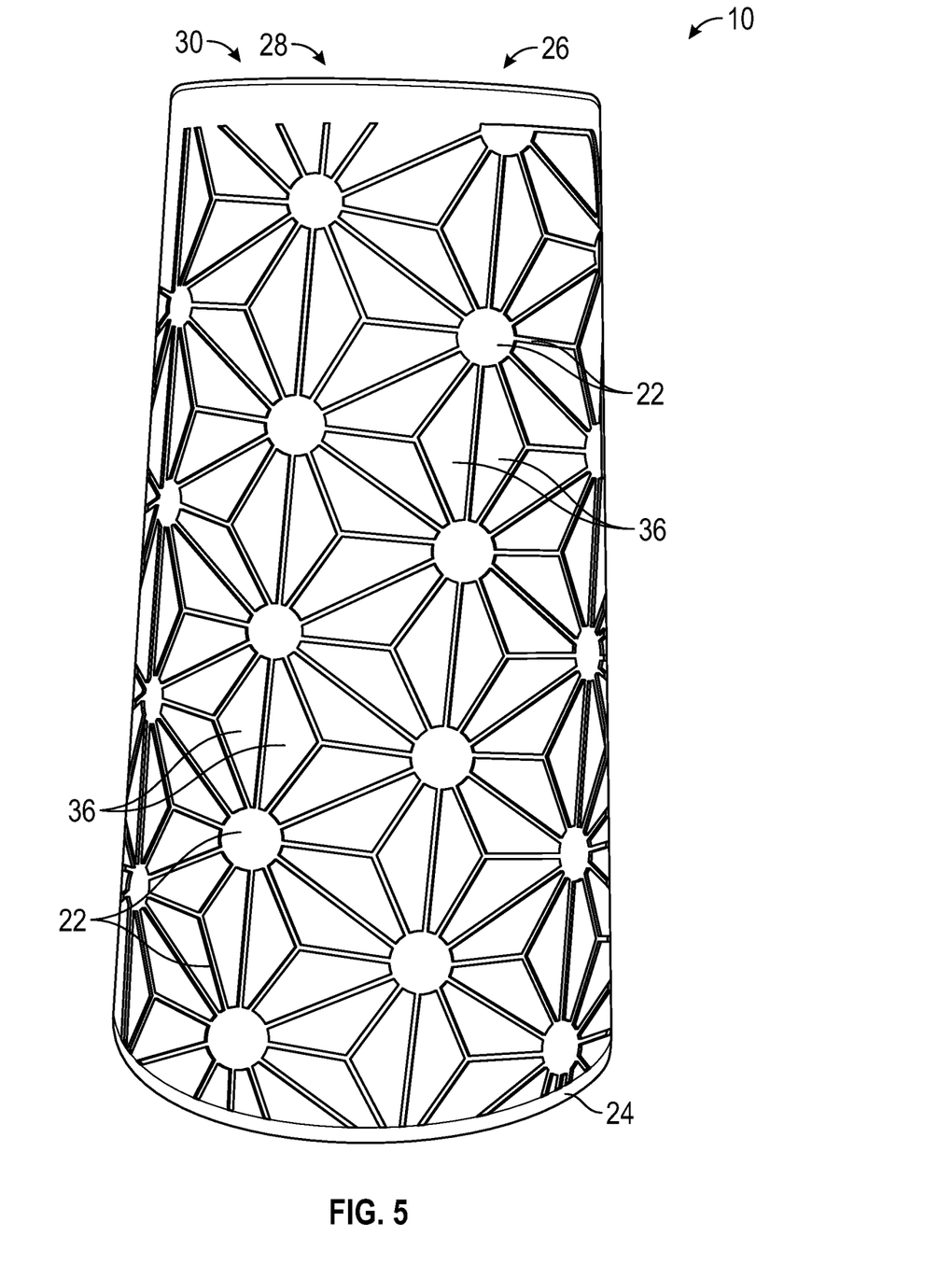
FIG. 5 is a front elevation view of an example embodiment employing a specific geometric pattern.

FIG. 5 illustrates another example embodiment of the ceramic apparatus 10 rendered in the form of a vase. In this particular embodiment, the plurality of tessellated indentations 22 form a geometric pattern of larger resolution than the embodiment illustrated in FIG. 1. This embodiment, therefore, may be suited to the growth of plants originating from larger seeds, say, or for creating particular patterns of smaller plants growing in communities along the indentations. Expanses 36 between the indentations 22 may be glazed, glossed, or otherwise sealed to prevent encroachment of plants growing within the indentations 22 and to restrict plant growth to conform to the pattern defined by the indentations 22. Thus a living geometry may be sustained on the exterior surface 20.

Figure 6:
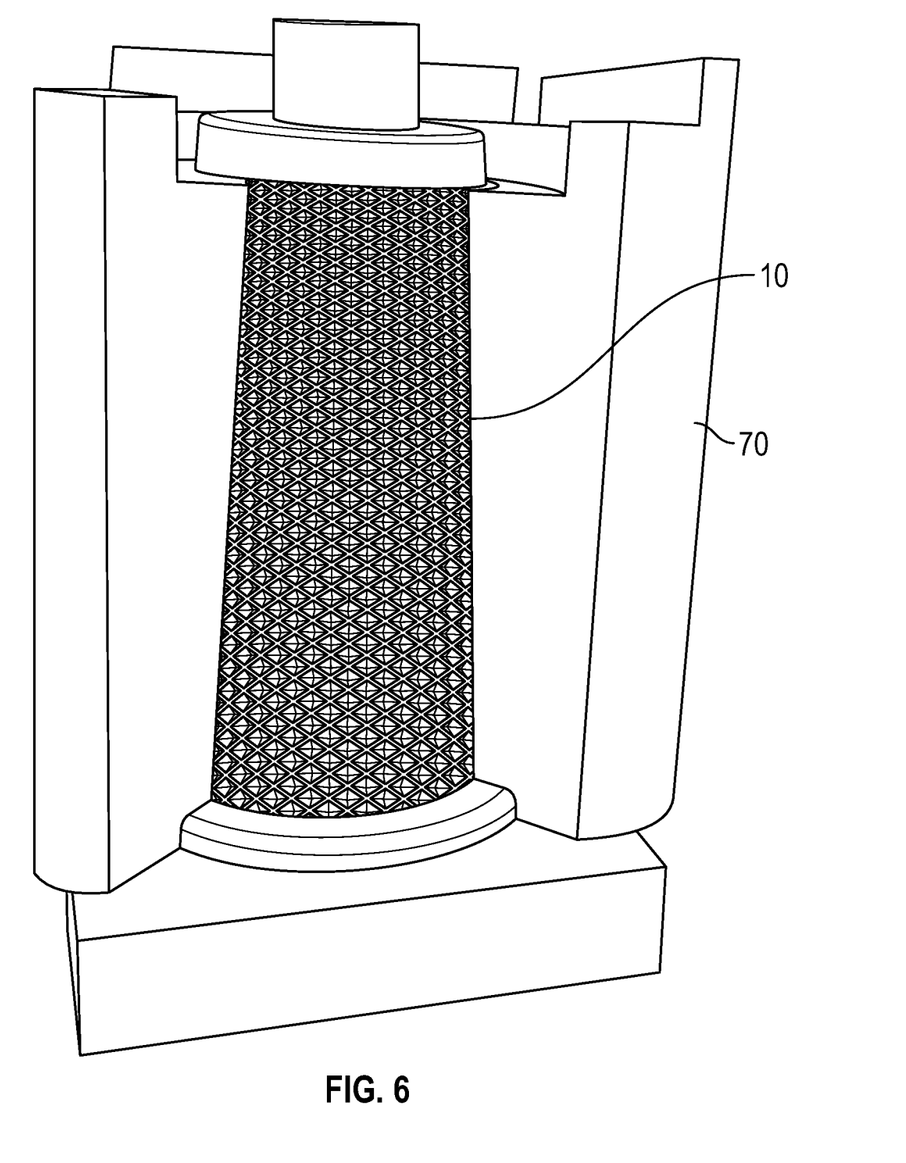
FIG. 6 is a front elevation view of an example embodiment slip cast interior to a mold for firing, said mold having one side removed to show the example embodiment inside.

FIG. 6 illustrates the production of the example embodiment shown in FIG. 1. Matrix 70 supports the ceramic 10 during slip casting to create the patterns informed by the plurality of tessellated indentations 22 over the exterior surface 20 previous to firing. Each embodiment is thus creatable by action of an individual matrix 70 impressing into the exterior surface 20. The matrix 70 is thence removed previous to firing to reveal the pre-fired ceramic 10 with the desired tessellated indentations 22 comprising at least a part of the exterior surface 20.

In embodiments such as exemplified in FIG. 5 (above), portions of the exterior surface 20 not impressed by the matrix 70 may be glazed previous to firing whereby coloration, gloss finish, and other features, may be additional to the design and thus used to create a patterned aesthetic devised to incorporate flora growing in the indentations 22 as a novel, living design. Additionally, sealant may be brushed onto portions of the exterior surface after firing to render portions impermeable.

Figure 7:
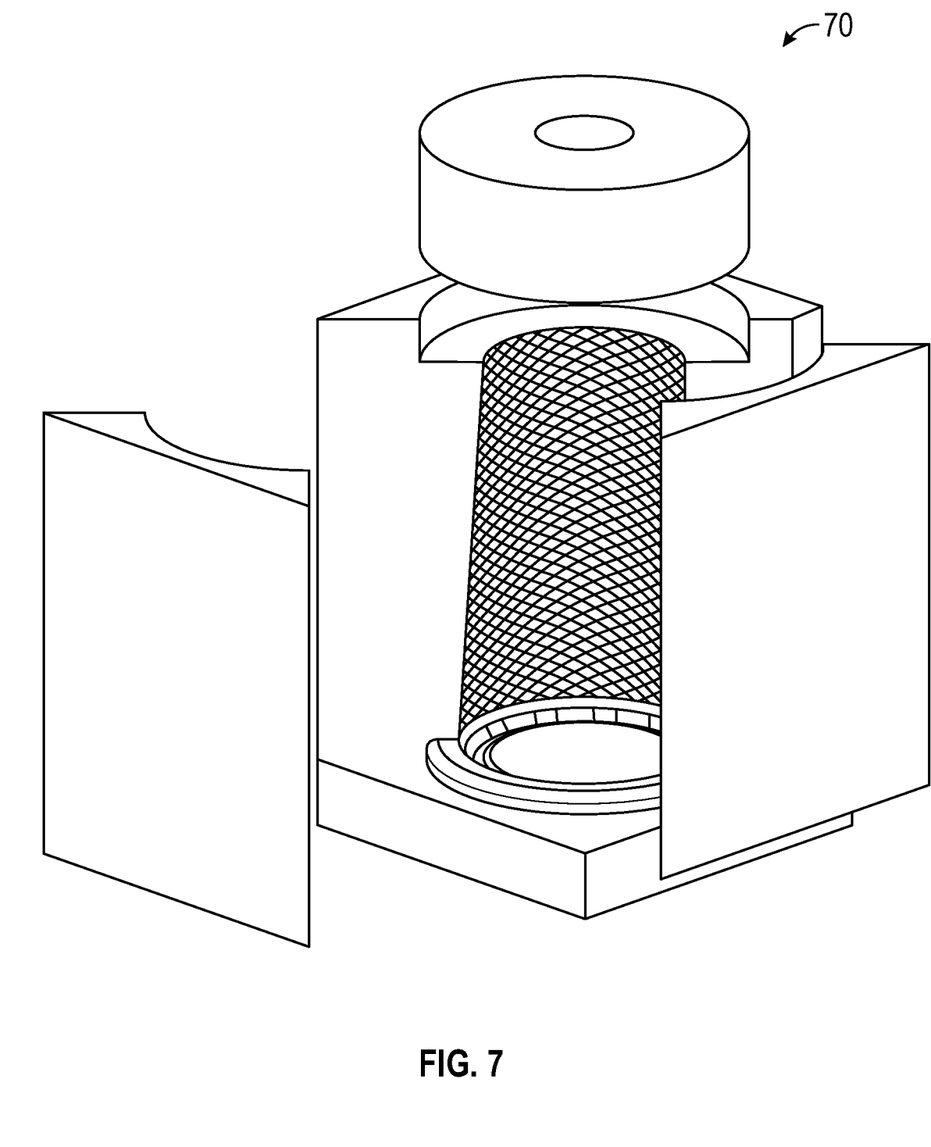
FIG. 7 is a front elevation view of an example embodiment of a slip cast mold having one side removed.

FIG. 7 shows an example embodiment of the matrix 70 absent the ceramic apparatus 10 workpiece therein.

FIGS. 8 and 9 illustrate an example embodiment of a graduated cross-section 40 disposed in example embodiments illustrated at least in FIG. 1, but nonetheless applicable to all embodiments wherein a hydrostatic pressure of standing water creates a pressure gradient within the water storage volume 30, the interior volume 28, or upon the ceramic apparatus 10 regardless of the shape of the ceramic apparatus 10 in contemplation. The graduated cross-section 40 regulates water flow through to the exterior surface 20 and thus controls the rate water is made available to flora disposed on the exterior surface 20.

Graduated cross-section 40 bounds the interior volume 28 from a minimum thickness 42 most proximal the open top 26 to a maximum thickness 44 most proximal the base member 24. The graduated cross-section 40 regulates water flow through the ceramic 10 from the interior volume 28 through to the exterior surface 20 to accommodate the hydrostatic pressure gradient of the water head exerted by the associated water column standing within the water storage volume 30. Greater pressure exerted at the bottom of the water column is balanced by the greater distance the water must travel through the porosity of the ceramic 10 at the maximum thickness 44, for example, in order to reach the exterior surface 20. Similarly, the lesser pressure exerted at the top of the water column more proximal the open top 26 is balanced by the lesser distance the water must travel through the porosity of the ceramic 10 at the minimum thickness 42 in order to reach the outer surface 20.

Thus water flow through the ceramic 10, and therefore water availability in general, is regulated and maintained consistently across the exterior surface 20 as long as there is water occupying the water storage volume 30. Further, the graduated cross-section 40 may match a gradation of thickness between the minimum thickness 42 to the maximum thickness 44 to the porosity and size of the ceramic 10 to properly regulate water flow over time whereby regular watering into the interior volume 28 is predictable.

The graduated cross-section 40 may be produced during slip-casting by allowing the liquid clay to drain from the mold at a regulated rate, whereby the pre-fired workpiece has a cross-section that is graduated at a continuous rate of change determined by the flow rate of the slip-cast draining through a lowermost aperture.

FIG. 10 illustrates example embodiments of the tessellated indentions informing the exterior surface of the present apparatus 10. These example embodiments are included to demonstrate that additional geometric arrays, patterns, forms, or other indentations, both regular and irregular, are contemplated as part of this invention. The particular tessellated indentations as contemplated herein are set forth, therefore, not as supposed limiting features of the present invention, but in example embodiments illustrative of the many potential variations that are contemplated as within the scope of the intended claims, as apprehensible by a person of ordinary skill.

What is claimed is:

1. A tessellated ceramic apparatus for plant growth comprising:
    an exterior surface having a plurality of tessellated indentations disposed in a geometric array thereupon;
    a water storage volume disposed in osmotic communication with the exterior surface; a flat expanse having the water storage volume disposed along one edge, said water storage volume sourcing a movement of water through the porosity of the ceramic apparatus; and
    wherein the exterior surface enables the proliferation of plants thereacross and the water storage volume sources available water hydrokinetically through a porosity of the ceramic apparatus.

2. The tessellated ceramic apparatus for plant growth of claim 1 wherein each of the plurality of tessellated indentations is ovoid or lozenge shaped and has a depth suitable for retaining seeds therein even when the ceramic apparatus is disposed attached to a vertical surface.

3. The tessellated ceramic apparatus for plant growth of claim 1 wherein the exterior surface further includes glazed, gloss, or sealed portions wherein plant growth is inhibited upon the glazed, gloss, or sealed portions.

4. A tessellated ceramic apparatus for plant growth comprising:
    an exterior surface having a plurality of tessellated indentations disposed in a geometric array thereupon;
    a water storage volume disposed in osmotic communication with the exterior surface;
    an open-topped interior volume; and
    a base member,
    wherein the exterior surface enables proliferation of plants thereacross and the water storage volume sources available water hydrokinetically through a porosity of the ceramic apparatus,
    wherein the water storage volume is coextensive with the interior volume and water is sourced to the exterior surface from within the interior volume,
    wherein the ceramic apparatus is conically shaped having a greatest diameter at the base, and
    wherein the ceramic apparatus includes a graduated cross-section comprising at least a minimum thickness and a maximum thickness, said minimum thickness disposed above the maximum thickness, whereby water flow from the interior volume through to the exterior surface is regulated to accommodate the relative change in hydrostatic pressure exerted by a water head contained within the interior volume.

5. The tessellated ceramic apparatus for plant growth of claim 4 wherein the ceramic apparatus is conically shaped having a greatest diameter at the base.

6. The tessellated ceramic apparatus for plant growth of claim 4 wherein the ceramic apparatus is parallelepiped.

7. The tessellated ceramic apparatus for plant growth of claim 4 wherein the exterior surface further includes glazed or gloss portions wherein plant growth is inhibited upon the glazed or gloss area.

8. The tessellated ceramic apparatus for plant growth of claim 4 wherein the exterior surface further includes glazed or gloss portions wherein plant growth is inhibited upon the glazed or gloss area.

9. A tessellated ceramic apparatus for plant growth comprising:
    an open-topped, ceramic body bounding an interior volume;
    a base portion disposed basally supporting the ceramic body;
    a lid member securable to enclose the open-topped ceramic body;
    an exterior surface, said exterior surface comprising a plurality of tessellated ovoid or lozenge-shaped indentations in geometric array thereover; and
    a graduated cross-section comprising a minimal thickness and a maximum thickness, said maximum thickness disposed more proximal the base portion than the minimum thickness;
    wherein water stored within the interior volume is sourced from the interior volume to the exterior surface along a concentration gradient through a porosity of the ceramic body, said sourced water thereby regulated by the graduated cross-section of the ceramic body, whereby water movement to the exterior surface is regulated despite differing hydrostatic pressures exerted by a hydraulic head of water stored within the interior volume.

10. The tessellated ceramic apparatus for plant growth of claim 9 wherein the exterior surface further includes glazed, gloss, or sealed portions wherein plant growth is inhibited upon the glazed, gloss, or sealed portions.

11. The tessellated ceramic apparatus for plant growth of claim 9 wherein each of the plurality of tessellated indentations is ovoid or lozenge shaped and has a depth suitable for retaining seeds therein.

12. The tessellated ceramic apparatus for plant growth of claim 9 wherein the plurality of tessellated indentations having a geometric pattern that is configured to support plant growth in a decorative pattern.

\* \* \* \* \*